(12) United States Patent
Tajima et al.

(10) Patent No.: US 11,494,142 B2
(45) Date of Patent: Nov. 8, 2022

(54) IMAGE PROCESSING APPARATUS, NON-TRANSITORY COMPUTER READABLE MEDIUM, AND METHOD FOR PROCESSING IMAGE

(71) Applicant: FUJIFILM Business Innovation Corp., Tokyo (JP)

(72) Inventors: Shingo Tajima, Kanagawa (JP);
Daisuke Noguchi, Kanagawa (JP);
Takashi Kikumoto, Kanagawa (JP);
Megumi Yamaguchi, Kanagawa (JP);
Yoshihiro Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 239 days.

(21) Appl. No.: 16/352,858

(22) Filed: Mar. 14, 2019

(65) Prior Publication Data
US 2019/0354328 A1 Nov. 21, 2019

(30) Foreign Application Priority Data

May 15, 2018 (JP) .............................. JP2018-093575

(51) Int. Cl.
*G06F 3/12* (2006.01)
(52) U.S. Cl.
CPC .......... *G06F 3/1256* (2013.01); *G06F 3/1208* (2013.01); *G06F 3/12* (2013.01); *G06F 3/1285* (2013.01)
(58) Field of Classification Search
CPC .... G06F 3/1256; G06F 3/1208; G06F 3/1285; G06F 3/1288; G06F 3/12

USPC ........................................................ 358/1.14
See application file for complete search history.

(56) References Cited

U.S. PATENT DOCUMENTS

| 10,048,538 B1* | 8/2018 | Fukuoka ................ G02F 1/1335 |
| 2007/0076178 A1* | 4/2007 | Ueda ....................... G03B 29/00 355/29 |
| 2009/0303504 A1 | 12/2009 | Iinuma et al. |
| 2012/0057006 A1* | 3/2012 | Joseph .................. H04N 13/302 348/51 |
| 2017/0264789 A1* | 9/2017 | Miyahara ............. H04N 1/6011 |

(Continued)

FOREIGN PATENT DOCUMENTS

| JP | 2902245 | 6/1999 |
| JP | 2002103726 | 4/2002 |

(Continued)

OTHER PUBLICATIONS

Office Action of Japan Counterpart Application, with English translation thereof, dated Dec. 7, 2021, pp. 1-5.

*Primary Examiner* — Darryl V Dottin
(74) *Attorney, Agent, or Firm* — JCIPRNET

(57) ABSTRACT

An image processing apparatus includes a reception unit that receives a print job which includes print data and which specifies back printing to be performed on a transparent recording medium, a generation unit that generates a display image to be printed on a front surface of the transparent recording medium and a display image to be printed on a back surface on the transparent recording medium on the basis of the print data included in the print job, and a display unit that displays the display image to be printed on the front surface and the display image to be printed on the back surface generated by the generation unit.

8 Claims, 12 Drawing Sheets

(56) References Cited

U.S. PATENT DOCUMENTS

2018/0007233 A1* 1/2018 Aramaki .............. G06V 30/413
2018/0319187 A1* 11/2018 Zhou .................... B41M 5/0047

FOREIGN PATENT DOCUMENTS

| JP | 2009181045 | 8/2009 |
| JP | 2017159552 | 9/2017 |

* cited by examiner

FIG. 6

| 605 | 610 | 615 | 620 | 625 | 630 | 635 | 640 | 645 | 650 | |
|---|---|---|---|---|---|---|---|---|---|---|
| PRINT JOB ID | PRINT JOB NAME | OWNER | No. OF PAGES | No. OF COPIES | RECORDING MEDIUM SIZE | FRONT/BACK PRINTING | PRINT DATA | SPECIFIED COLOR MATERIAL | RECORDING MEDIUM | ... |
| 1 | LABEL XX-1 | USER A | 16 | 50 | A4 | BACK PRINTING | | | | |

FIG. 7

| IMAGE FORMING APPARATUS ID | IMAGE FORMING APPARATUS NAME | COLOR MATERIAL TYPE | No. OF PAPER FEED MEANS | RECORDING MEDIUM | | ... |
|---|---|---|---|---|---|---|
| | | | | RECORDING MEDIUM SIZE | RECORDING MEDIUM COLOR | |
| 710 | 720 | 730 | 740 | 752 | 754 | 700 |

FIG. 12A1
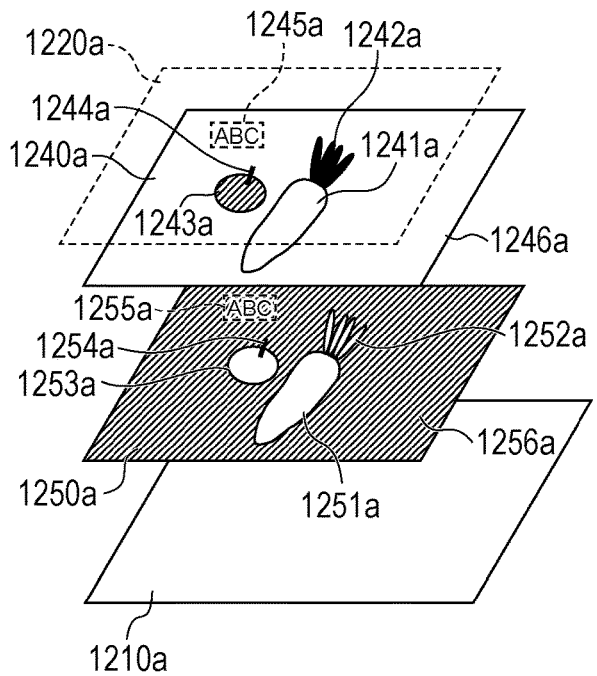
FIG. 12B1
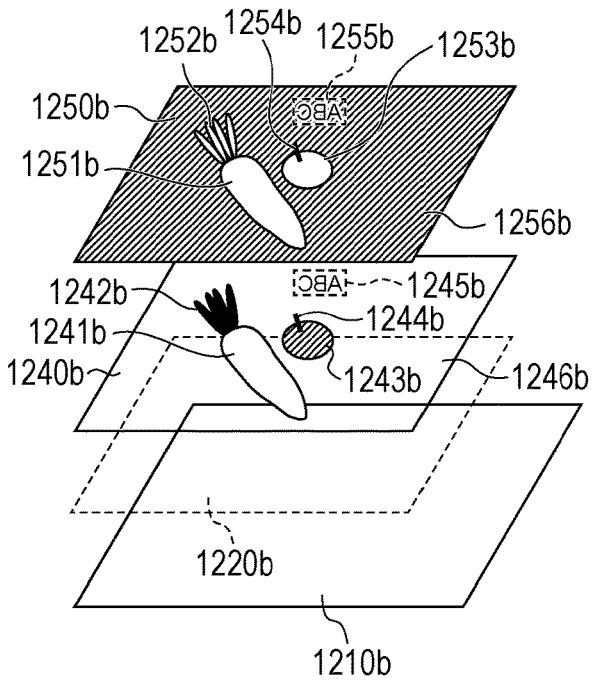
FIG. 12A2
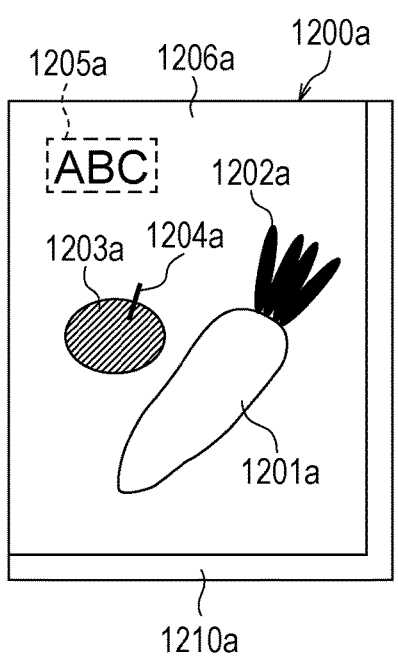
FIG. 12B2
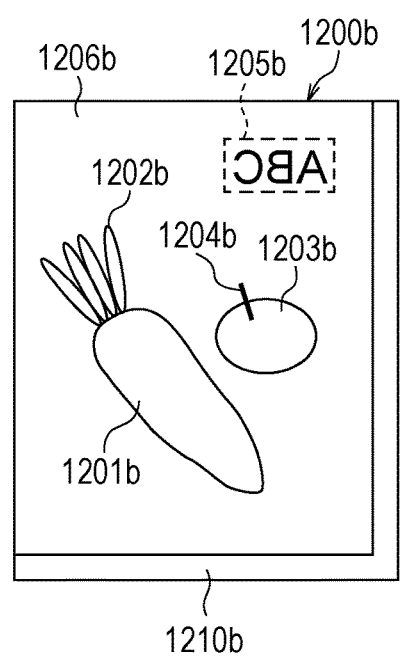

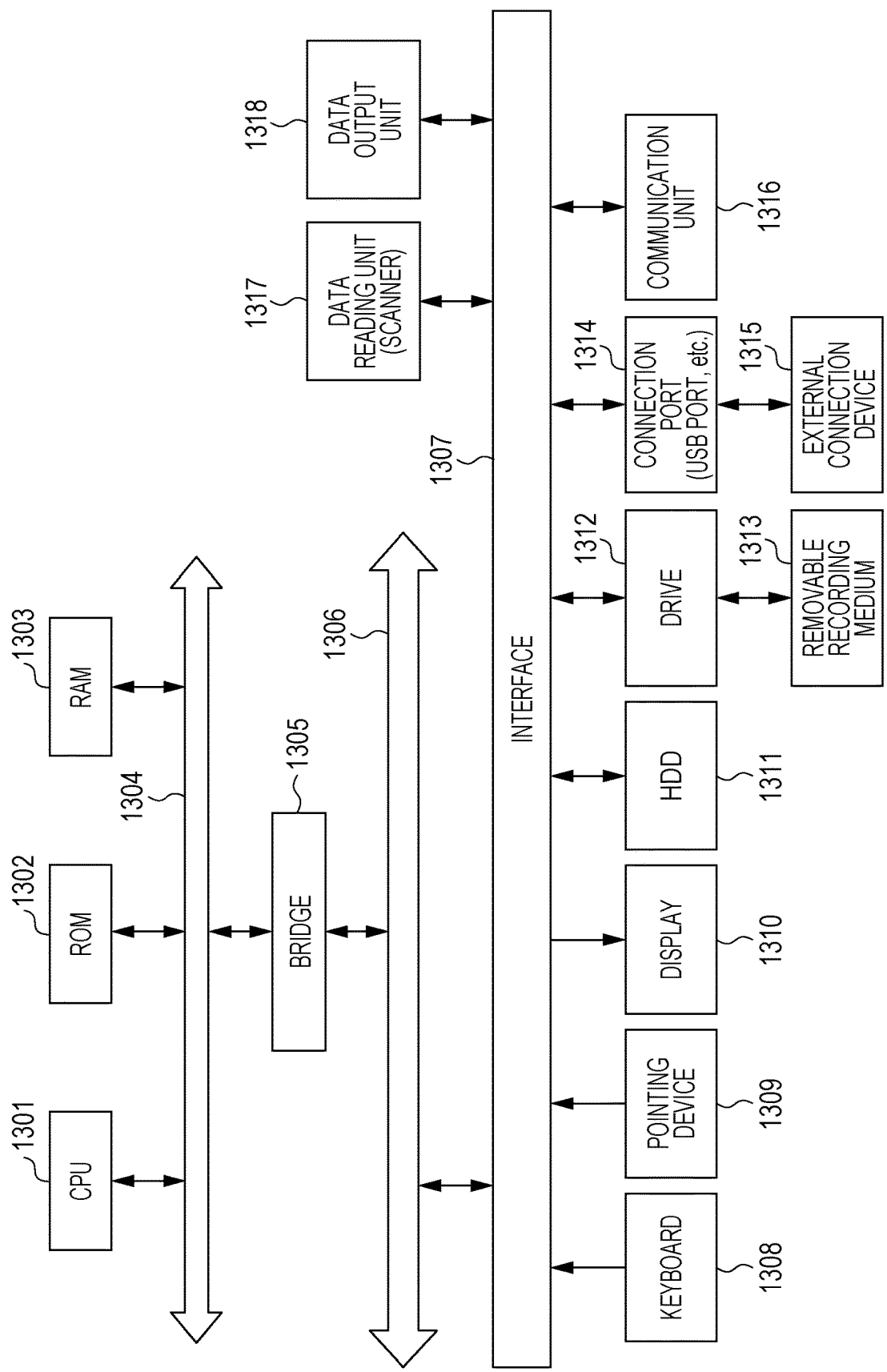

IMAGE PROCESSING APPARATUS, NON-TRANSITORY COMPUTER READABLE MEDIUM, AND METHOD FOR PROCESSING IMAGE

CROSS-REFERENCE TO RELATED APPLICATIONS

This application is based on and claims priority under 35 USC 119 from Japanese Patent Application No. 2018-093575 filed May 15, 2018.

BACKGROUND

(i) Technical Field

The present disclosure relates to an image processing apparatus, a non-transitory computer readable medium, and a method for processing an image.

(ii) Related Art

Japanese Patent No. 2902245 aims to provide a method for forming an image capable of forming a large number of illumination films in a short period of time and obtaining glossy, dense images through image formation in which an image forming apparatus that employs toner, such as an electrophotography apparatus or an electrostatic recording apparatus is used. A mirror image is formed on a transparent film using toner of at least one of magenta, cyan, yellow, and black and an evenly white layer is formed over the mirror image on the transparent film, in order to form a normal image seen through the transparent film.

Japanese Unexamined Patent Application Publication No. 2017-159552 aims to generate a preview image that simulates a result of printing according to types of color materials, printing order of the color materials, the number of printing operations, and a type of base material. An ordinary printing order specification unit specifies the types of color materials used when document data is printed and the printing order of the color materials. A multiple printing order and base material specification unit specifies at least either the number of ordinary printing operations based on the types of color materials and the printing order of the color materials specified by the ordinary printing order specification unit or the type of base material. A preview image generation unit generates a preview image that simulates a result of the printing of the document data on the basis of the information specified by the ordinary printing order specification unit and the multiple printing order and base material specification unit.

SUMMARY

Before an image forming apparatus performs printing, an image to be printed (preview image) is displayed on a monitor. When back printing is performed, print data itself is mirror-inverted, and printing order of the print data is also reversed. If the image to be printed is displayed on the monitor as it is, the image seen from a back surface of a print subjected to the back printing is undesirably displayed. In addition, it is often desired to check not only a front surface but also a back surface in the case of back printing.

Aspects of non-limiting embodiments of the present disclosure relate to an image processing apparatus, a non-transitory computer readable medium, and a method for processing an image capable of generating a display image to be printed on a front surface and a display image to be printed on a back surface and displaying both the display images.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a reception unit that receives a print job which includes print data and which specifies back printing to be performed on a transparent recording medium, a generation unit that generates a display image to be printed on a front surface of the transparent recording medium and a display image to be printed on a back surface on the transparent recording medium on the basis of the print data included in the print job, and a display unit that displays the display image to be printed on the front surface and the display image to be printed on the back surface generated by the generation unit.

BRIEF DESCRIPTION OF THE DRAWINGS

An exemplary embodiment of the present disclosure will be described in detail based on the following figures, wherein:

FIG. 6 is a diagram illustrating an example of the data structure of a print job table;

FIG. 7 is a diagram illustrating an example of the data structure of an image forming apparatus information table;

FIGS. 12A1 to 12B2 are diagrams illustrating examples of processes according to the exemplary embodiment; and FIG. 13 is a block diagram illustrating an example of the hardware configuration of a computer that achieves the exemplary embodiment.

DETAILED DESCRIPTION

An exemplary embodiment of the present disclosure will be described hereinafter with reference to the drawings.

Figure 1:
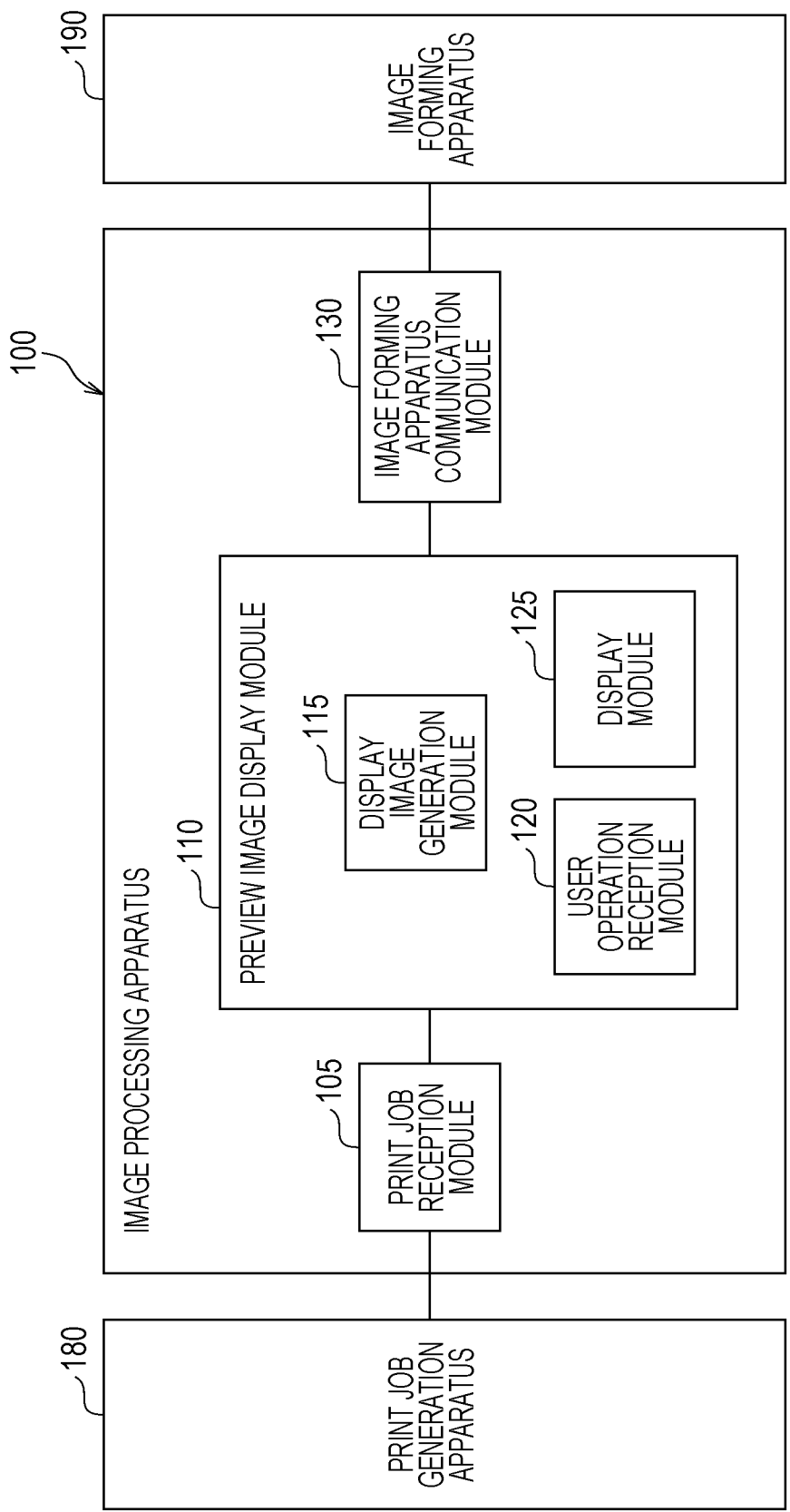
FIG. 1 is a conceptual diagram illustrating an example of the configuration of modules according to an exemplary embodiment.

FIG. 1 is a conceptual diagram illustrating an example of the configuration of modules according to the present exemplary embodiment.

A term "modules" generally refers to software (computer program) or hardware components logically separable from one another. That is, the modules in the present exemplary embodiment may be not only modules achieved by computer programs but also modules included in a hardware configuration. The present exemplary embodiment therefore also applies to a computer program (a program for causing a computer to perform steps, a program for causing a computer to function as means, or a program for causing a computer to achieve functions), a system, and a method for achieving these modules. Although "store", "stored" and other equivalent terms will be used for convenience of description, these terms mean, when an exemplary embodiment implements the present disclosure as a computer program, that the computer program is stored in a storage device or the storage device is controlled in such a way as to store the computer program. The modules may be in one-to-one correspondence with functions, but in practice, one module may be achieved by one program, a plurality of modules may be achieved by one program, or one module may be achieved by a plurality of programs. A plurality of modules may be executed by one computer, or one module may be executed by a plurality of computers in distributed or parallel computing. One module may include another module. In the following description, a term "connection" will be used not only for a physical connection but also for a logical connection (communication of data, issuance of instructions, reference relationships of data, login, etc.). A term "predetermined" will be used when something is determined prior to a target process. The term "predetermined" will be used not only when something is determined prior to a process according to the present exemplary embodiment but also when something is determined prior to a target step in accordance with a situation or a state at the time or a situation or a state so far, even if a process according to the present exemplary embodiment has already started. When there are a plurality of predetermined values, the values may be different from one another or two or more of the values (or all the values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and it is possible that only one of the items (e.g., only A) is selected.

A system or an apparatus may be achieved by a plurality of computers, a plurality of pieces of hardware, a plurality of apparatuses, or the like connected to one another through communication means such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of a plurality of processes performed by a module, and a result of the process is written to the storage device after the process is completed. Description of the reading of information from the storage device before a process and the writing of a result to the storage device after a process, therefore, might be omitted. The storage device may be a hard disk, a random-access memory (RAM), an external storage medium, a storage device through a communication link, a register of a central processing unit (CPU), or the like.

An image processing apparatus 100 is connected to a print job generation apparatus 180 and an image forming apparatus 190 and transmits a print job received from the print job generation apparatus 180 to the image forming apparatus 190. As illustrated in FIG. 1, the image processing apparatus 100 includes a print job reception module 105, a preview image display module 110, and an image forming apparatus communication module 130. Although one print job generation apparatus 180 and one image forming apparatus 190 are connected to the image processing apparatus 100 in FIG. 1, a plurality of print job generation apparatuses 180 and a plurality of image forming apparatuses 190 may be connected, instead.

The print job generation apparatus 180 is connected to the print job reception module 105 of the image processing apparatus 100. The print job generation apparatus 180 generates a print job and, in order to cause the image forming apparatus 190 to perform printing, transmits the print job to the image processing apparatus 100 (print job reception module 105). For example, a print job is generated as a result of a print instruction issued by a user and transmitted to the image processing apparatus 100.

The image processing apparatus 100 receives a print job from the print job generation apparatus 180 and transfers the print job to the image forming apparatus 190 in accordance with a print schedule. The image processing apparatus 100 also displays, on a display device such as a liquid crystal display, an image to be printed in the print job to allow the user to check and adjust tones and the like. That is, the image processing apparatus 100 produces the same effect as trial printing on the display device. It is therefore desirable for the display device to display an image with the same tones as on a recording medium (also referred to as a "sheet" or a "medium"). A color of a recording medium is also called a "medium color". When printing is performed on a transparent recording medium, it is particularly desirable to be able to display a display image to be printed on a front surface of the recording medium and a display image to be printed on a back surface of the recording medium.

The image forming apparatus 190 is connected to the image forming apparatus communication module 130 of the image processing apparatus 100. The image forming apparatus 190 performs a printing process on the basis of a print job received from the image processing apparatus 100 (image forming apparatus communication module 130). The present exemplary embodiment is suitable especially when a color material called a "special color" different from basic recording colors is available in the image forming apparatus 190. A color material is generally toner but may be ink. The basic recording colors are generally cyan (C), magenta (M), yellow (Y), and black (K). Alternatively, the basic recording colors may be cyan, magenta, and yellow. In the following description, cyan, magenta, yellow, and black will be used as an example of the basic recording colors. The special color different from the basic recording colors is a color different from cyan, magenta, yellow, and black (or a color different from cyan, magenta, and yellow), namely, for example, white, silver, gold, or the like.

The print job reception module 105 is connected to the preview image display module 110 and the print job generation apparatus 180. The print job reception module 105 receives a print job from the print job generation apparatus 180 and transfers the print job to the preview image display module 110. The received print job includes print data and the number of copies to be printed. A print job table 600, for example, is received as a print job.

FIG. 6 is a diagram illustrating an example of the data structure of the print job table 600. The print job table 600 includes a print job identifier (ID) field 605, a print job name field 610, an owner field 615, a number of pages field 620, a number of copies field 625, a recording medium size field 630, a front/back printing field 635, a print data field 640, a specified color materials field 645, and a recording medium field 650. The print job ID field 605 stores information (print job ID) for uniquely identifying a print job in the present exemplary embodiment. The print job name field 610 stores a name of the print job. The owner field 615 stores a name of an owner of the print job. The owner herein refers to an owner of a print to be obtained as a result of the print job. Alternatively, the owner may refer to a person who has requested the print job. The number of pages field 620 stores the number of pages of a document in the print job. The number of copies field 625 stores the number of copies to be printed as a result of the print job. The recording medium size field 630 stores the size (A4 or the like) of a recording medium. The front/back printing field 635 stores information indicating front printing or back printing. The print data field 640 stores print data. The print data may be a portable document format (PDF), image data, or the like. The specified color materials field 645 stores specified color materials to be used by the image forming apparatus 190 for the print job. In the specified color materials field 645, (1) color materials to be used in printing may be specified or (2) a color material (B) may be specified for a color (A) included in the print data. In the case of (2), for example, a white color material might be specified for a color of white included in print data. The recording medium field 650 stores a type of recording medium to be used for printing. In the recording medium field 650, a type of recording medium (e.g., includes a color and a material of the recording medium; more specifically, a transparent film, etc.) to be used for printing is specified. When a recording medium is not transparent, the front/back printing field 635 may indicate front printing.

The print job reception module 105 receives, above all, a print job that includes print data and that specifies back printing to be performed on a transparent recording medium. This occurs when back printing is specified in the front/back printing field 635 and a transparent recording medium is specified in the recording medium field 650.

The term "transparent" may refer not only to a fully transparent state but also to a translucent state (tinted state). A transparent recording medium may be, for example, a film.

Back printing is printing that assumes that a print is to be seen through a recording medium (from a surface opposite a print surface). In back printing, an image is printed on a back surface of a transparent recording medium in an opposite direction and in a reverse printing order. Since the image is seen through the transparent recording medium, a printing effect improves, and wear and staining of a print surface can be prevented.

The print job reception module 105 may also receive a print job in which front printing is specified.

The preview image display module 110 includes a display image generation module 115, a user operation reception module 120, and a display module 125 and is connected to the print job reception module 105 and the image forming apparatus communication module 130. The preview image display module 110 causes the display module 125 to display print data included in a print job received from the print job reception module 105 on the display device. At this time, the preview image display module 110 may change a displayed image (a display image to be printed on a front surface or a display image to be printed on a back surface) in accordance with a user operation received by the user operation reception module 120.

The display image generation module 115 generates a display image to be printed on a front surface of a recording medium and a display image to be printed on a back surface of the recording medium on the basis of print data included in a print job received by the print job reception module 105. The display image generation module 115 transmits the generated display images to the display module 125.

A "display image to be printed on a front surface" refers to an image seen as a normal image. That is, when back printing is performed on a transparent recording medium, a display image to be printed on a front surface is an image seen through the recording medium. When front printing is performed, a display image to be printed on a front surface is an image seen on a print surface. A "display image to be printed on a back surface" refers to a normal image seen from the back. That is, when back printing is performed on a transparent recording medium, a display image to be printed on a back surface is an image seen on a print surface. When front printing is performed, a display image to be printed on a back surface is an image seen through the recording medium. Details will be described later with reference to FIG. 3.

If front printing is specified in a print job received by the print job reception module 105, the display image generation module 115 may generate only a display image to be printed on a front surface of a recording medium. That is, in this case, a display image to be printed on a back surface is not generated.

The display image generation module 115 may also generate a display image obtained by printing a special color lastly. A special color may be, as described above, white, a metallic color (e.g., silver) or the like. When back printing is performed on a transparent recording medium, a special color is printed lastly so that a background of a print (since the recording medium is transparent, the background depends on an environment (situation); e.g., when the recording medium is put on a table, a surface of the table is the background) does not affect the printing. That is, an effect of a color behind a print is reduced using a special color.

In the case of front printing, a special color (e.g., white) is printed first so that a color of a recording medium does not affect a printed image. When a recording medium is colored (e.g., black), for example, a special color is hidden behind CMYK. The special color, however, reduces an effect of the color of the recording medium upon a CMYK printed image. When a recording medium is black and no special color is used, a printed image undesirably looks blackish. When a special color is used, on the other hand, original colors of a printed image are reproduced.

The display image generation module 115 may mirror-invert print data and draw the print data in a reverse printing order to generate a display image to be printed on a front surface. That is, in this case, the display image is generated in the same manner as in back printing.

The display image generation module 115 generates a display image for a preview that simulates an effect of a color of a colored recording medium upon a CMYK image or covering of a color of a recording medium by an undercoat white color material as a function of previewing a print for which a colored recording medium other than white, which may be a transparent recording medium, or a white color material is used.

The user operation reception module 120 receives a user operation through a mouse, a keyboard, or the like and transfers information regarding the operation (e.g., an instruction to switch between the front surface and the back surface, an instruction to change tones, etc.) to the preview image display module 110. The user operation reception module 120 may also receive a user operation (may be a line of sight, a gesture, or a speech sound) through a camera, a microphone, or the like.

The display module 125 displays a display image generated by the display image generation module 115 on the display device. The display module 125 may also present a message to the user as a sound from a speaker or a tactile sensation from a tactile device.

In addition, a liquid crystal display that also serves as a touch panel may be used as the user operation reception module 120 and the display module 125. The liquid crystal display may receive a user operation and display an image for the user.

The display module 125 can also display a display image to be printed on a front surface and a display image to be printed on a back surface generated by the display image generation module 115.

In this case, the display module 125 may display both display images (a front surface and a back surface) on a screen or may display either a display image to be printed on a front surface or a display image to be printed on a back surface on a screen. In the latter case, one of the two display images may be selected in accordance with a user operation (display switching operation), or the two display images may be sequentially displayed in predetermined order. For example, a display image to be printed on a front surface and a display image to be printed on a back surface may be alternately displayed at predetermined time intervals. The reason why the display image to be printed on the back surface is displayed is that, in the case of a transparent recording medium, a printed image can be seen from the back surface (print surface). It is needless to say that, in the case of an opaque recording medium, a printed image is not usually seen from a back surface (through the recording medium) unless the user looks through the recording medium in the light.

If back printing is specified in a print job received by the print job reception module 105, the display module 125 may display a display image to be printed on a front surface of a recording medium in an initial setting (default). That is, if back printing is specified, a display image to be printed on a front surface, which is a normal image, is displayed as a default since the back printing is performed on a transparent recording medium. Even when a display image to be printed on a front surface is a default, a display image to be printed on a back surface may be displayed if a user issues an instruction.

If front printing is specified in a print job received by the print job reception module 105, the display module 125 may display only a display image to be printed on a front surface generated by the display image generation module 115. This is because a display image to be printed on a back surface need not be displayed.

The image forming apparatus communication module 130 is connected to the preview image display module 110 and the image forming apparatus 190. The image forming apparatus communication module 130 transfers a print job to the image forming apparatus 190 in accordance with a print schedule. The preview image display module 110 might have adjusted tones for the print job. The image forming apparatus 190 is managed, for example, using an image forming apparatus information table 700.

FIG. 7 is a diagram illustrating an example of the data structure of the image forming apparatus information table 700. The image forming apparatus information table 700 includes an image forming apparatus ID field 710, an image forming apparatus name field 720, a color material type field 730, a number of paper feed means field 740, and recording medium fields 750. Each recording medium field 750 includes a recording medium size field 752 and a recording medium color field 754. In the present exemplary embodiment, the image forming apparatus ID field 710 stores information (image forming apparatus ID) for uniquely identifying the image forming apparatus 190. The image forming apparatus name field 720 stores a name of the image forming apparatus 190. The color material type field 730 stores a type of color material included (includable) in the image forming apparatus 190. The type of color material may be, for example, a type of color material of the above-mentioned special color. The number of paper feed means field 740 stores the number of paper feed means included in the image forming apparatus 190. The recording medium fields 750 as many as the number of paper feed means follow the number of paper feed means field 740. The recording medium fields 750 each store an attribute of a recording medium stored in a corresponding paper feed unit. The recording medium size fields 752 each store the size of a recording medium, which is, for example, A4. The recording medium color fields 754 each store a color of a recording medium, which is, for example, white, red, or transparent. Alternatively, a material of the recording medium may be stored instead of a color. Although not illustrated, the storage medium fields 750 may each store the maximum number of pieces of a recording medium that can be stored in paper feed means or the number of pieces of a recording medium actually stored in storage means. The image forming apparatus information table 700 can be accessed by the preview image display module 110.

Figure 2:
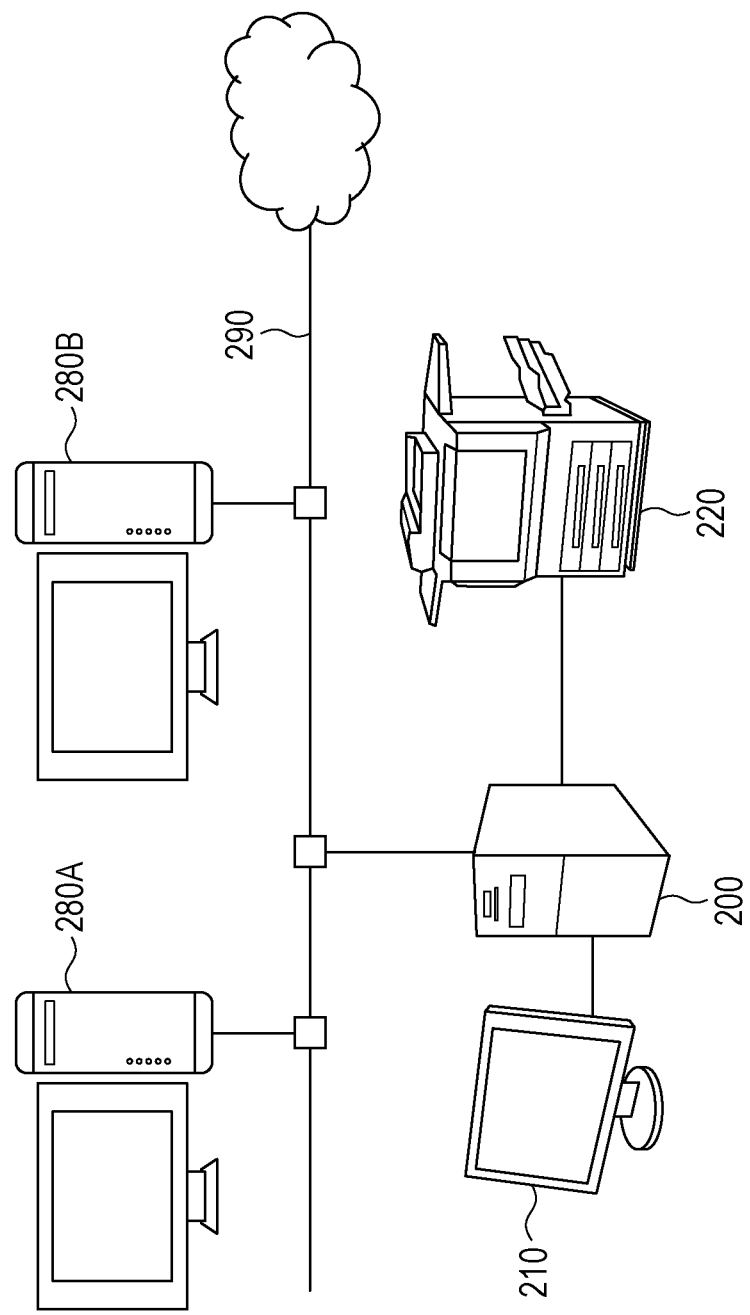
FIG. 2 is a diagram illustrating an example of the configuration of a system according to the exemplary embodiment.

FIG. 2 is a diagram illustrating an example of the configuration of a system according to the present exemplary embodiment.

This is an example in which the print job generation apparatus 180 is constructed in user terminals 280A and 280B, the image processing apparatus 100 is constructed in a print server 200, and the image forming apparatus 190 is achieved as a printing apparatus 220. In this example, the display module 120 displays display images and the like on a display device 210.

The print server 200 is connected to the display device 210 and the printing apparatus 220. The print server 200 has a function of a printer controller (digital front end (DFE)) and is also connected to the user terminals 280A and 280B through a communication link 290. The communication link 290 may be of a wireless or wired type or a combination of the two, and may be, for example, the Internet or an intranet as a communication infrastructure. Functions of the print server 200 may be achieved as a cloud service. More specifically, display images are transmitted to the user terminals 280A and 280B and the like, and users can view the display images on browsers and perform operations (adjustment of tones, etc.) on the display images.

The display device 210 is a liquid crystal display or the like connected to the print server 200. The display module 120 displays display images and the like on the display device 210. The printing apparatus 220 is connected to the print server 200, has a function of a printer, and performs printing on a transparent recording medium or the like. The user terminals 280A and 280B are operated by users to generate print jobs through instructions to print documents. The print jobs are then transmitted to the print server 200 through the communication link 290.

Figure 3:
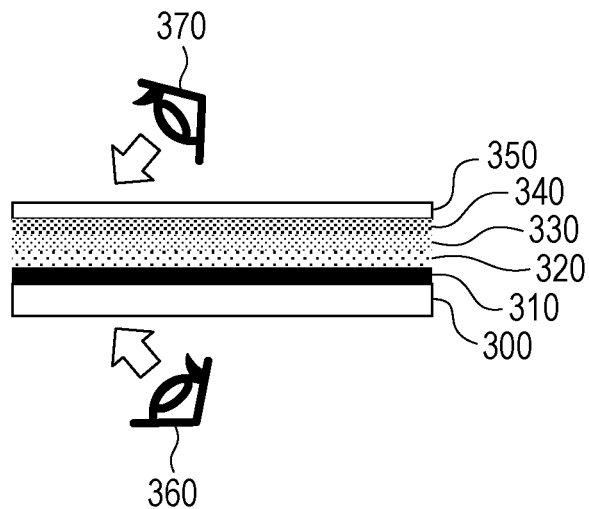
FIG. 3 is a diagram illustrating an example of a state achieved by performing back printing on a transparent recording medium.

FIG. 3 is a diagram illustrating an example of a state achieved by performing back printing on a transparent recording medium 300.

FIG. 3 illustrates a black color material 310, a yellow color material 320, a magenta color material 330, a cyan color material 340, and a white color material 350 printed on the transparent recording medium 300 in this order as a result of the back printing. In the case of a front view 360, a printed image is seen through the recording medium 300 (from below in FIG. 3) as a normal image. Back printing is usually performed on a transparent recording medium 300 such as a film. A printed image is mirror-inverted, and colors are printed in reverse order. The inversely printed image is seen through the film. Since a print is seen through the recording medium 300, wear and staining of a print surface are prevented, which is suitable for a print that requires durability. Back printing is used, for example, for label printing. In the case of the front view 360, the white color material serves as a background of the printed image. Since the white color material 350 is used, back printing can be performed on the transparent recording medium 300.

In the case of a back view 370, on the other hand, the print is seen from the back (a surface on which the image is printed; a side of the white color material 350). That is, only the white color material 350 can be seen. Because the white color material 350 is usually not thick enough to block light, however, the printed image below (the cyan color material 340, the magenta color material 330, the yellow color material 320, and the black color material 310) can also been seen. There is a desire to check not only the printed image in the front view 360 but also the white color material 350. For this purpose, a display image in the front view 360 and a display image in the back view 370 need to be generated as preview images.

In a conventional preview, image data is disposed on a recording medium in order of a background (a background in an environment in which a print is seen), the recording medium, CMYK color materials, and a color material of a special color.

When back printing is performed on a transparent recording medium, such as in the case of a label printing, a mirror-inverted CMYK image is usually printed on the recording medium, and then white data is disposed upon colored areas as an overcoat.

If a preview image of a print job for back printing performed on a transparent recording medium is displayed in a conventional preview, only a preview image obtained by printing white on a mirror-inverted CMYK image can be expressed, and a preview image seen through the recording medium is undesirably not displayed. In the present exemplary embodiment, a preview image in the front view 360 is displayed.

Figure 4:
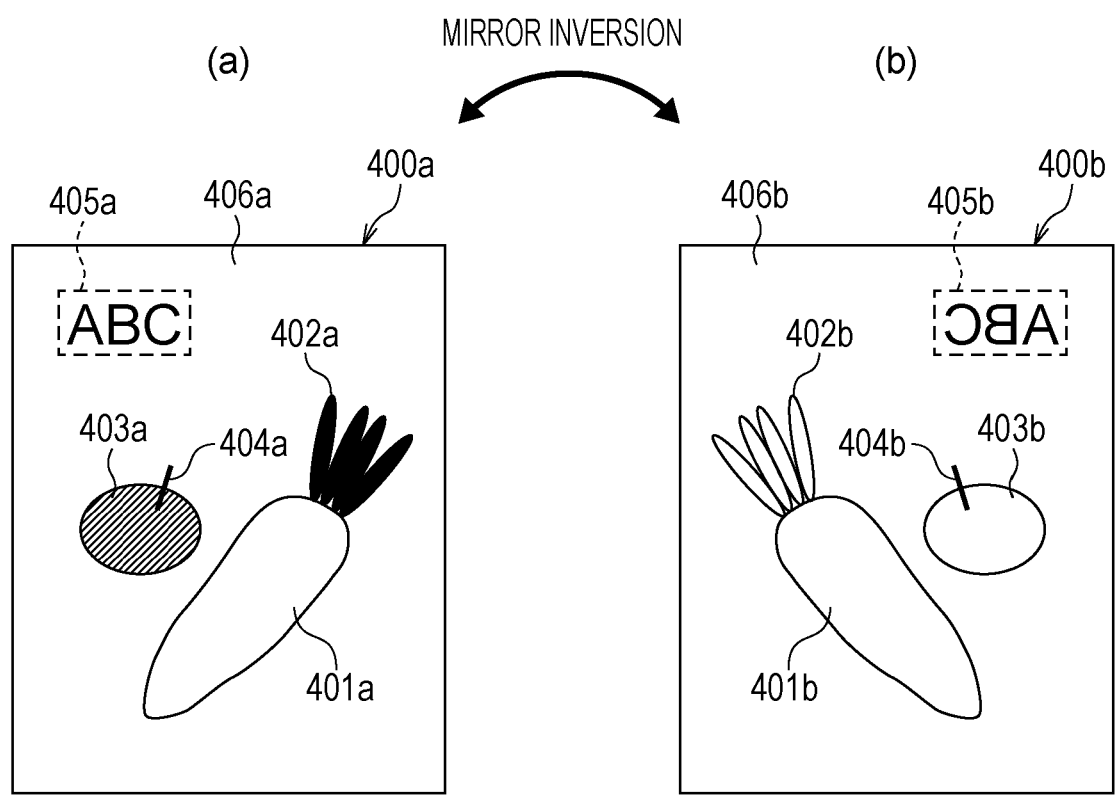
FIG. 4 is a diagram illustrating an example of a display image to be printed on a front surface and a display image to be printed on a back surface.

FIG. 4 is a diagram illustrating an example of a display image to be printed on a front surface and a display image to be printed on a back surface.

A front surface display image 400*a* illustrated in FIG. 4(*a*) includes a white area 401*a*, a green area 402*a*, a red area 403*a*, a black area 404*a*, and a text area (black) 405*a*.

A back surface display image 400*b* illustrated in FIG. 4(*b*) includes white areas 401*b*, 402*b*, 403*b*, and 404*b* and a text area (white) 405*b*.

Because backgrounds 406*a* and 406*b* indicate a transparent recording medium, it is desirable to use the same color as that of a background of a display application. Alternatively, a predetermined color (e.g., white) may be used. The front surface display image 400*a* and the back surface display image 400*b* are mirror-inverted images and drawn in opposite order. More specifically, in the front surface display image 400*a*, the white color material 350, the cyan color material 340, the magenta color material 330, the yellow color material 320, and the black color material 310 are printed in this order. In the back surface display image 400*b*, the black color material 310, the yellow color material 320, the magenta color material 330, the cyan color material 340, and the white color material 350 are printed in this order. In the front surface display image 400*a* and the back surface display image 400*b*, the printing order is simulated using alpha blending. When the display images 400*a* and 400*b* are generated, the cyan color material 340, the magenta color material 330, the yellow color material 320, and the black color material 310 may be treated as a set of process color values for each pixel. The set of process color values may be converted into corresponding red, green, and blue (RGB) values through mapping conversion (mapping conversion from image data in a CMYK space, a Lab/XYZ space, or the like, which is print data, into a display image (preview image) in an RGB space), and alpha blending may be performed between the obtained RGB values and image data mapped in an RGB space corresponding to the white color material 350.

Figure 5:
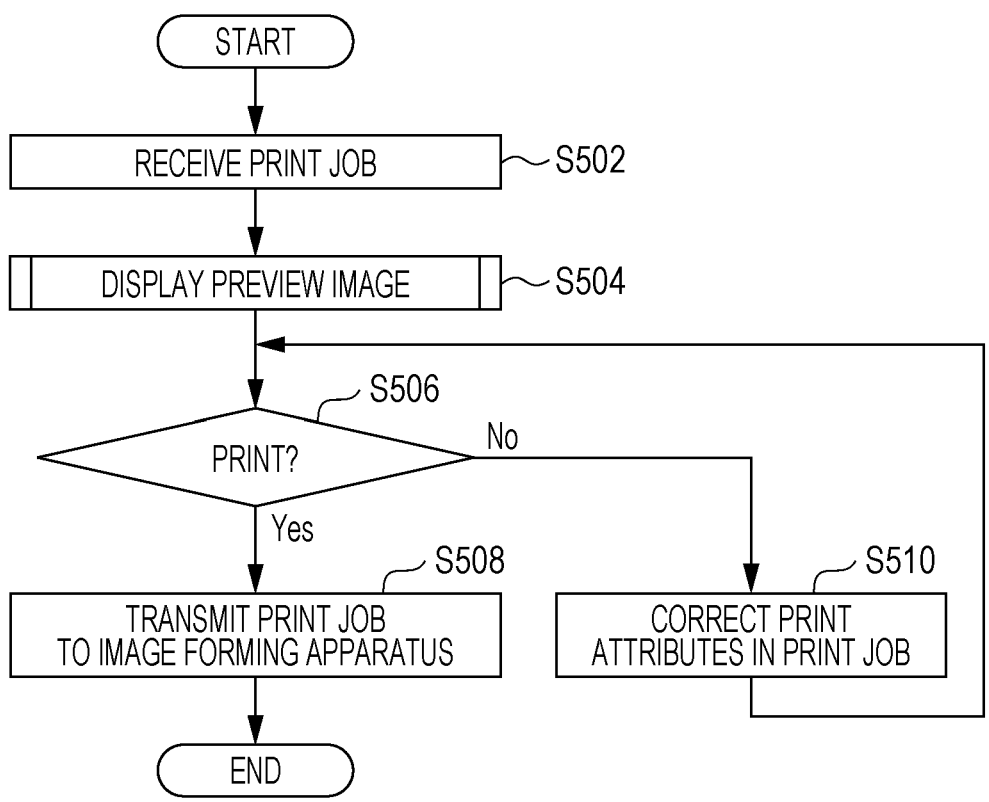
FIG. 5 is a flowchart illustrating an example of a process performed by the system according to the exemplary embodiment.

FIG. 5 is a flowchart illustrating an example of a process performed by the system according to the present exemplary embodiment.

In step S502, the print job reception module 105 receives a print job.

In step S504, the preview image display module 110 displays a preview image. Details of step S504 will be described later with reference to a flowchart of FIG. 8.

In step S506, the preview image display module 110 determines, in accordance with a user operation, whether to perform printing. If so, the process proceeds to step S508, and if not, the process proceeds to step S510.

In step S508, the display module 125 transmits the print job to the image forming apparatus 190.

In step S510, the preview image display module 110 corrects print attributes (e.g., tones) of the print job in accordance with a user operation. The process returns to step S506.

Figure 8:
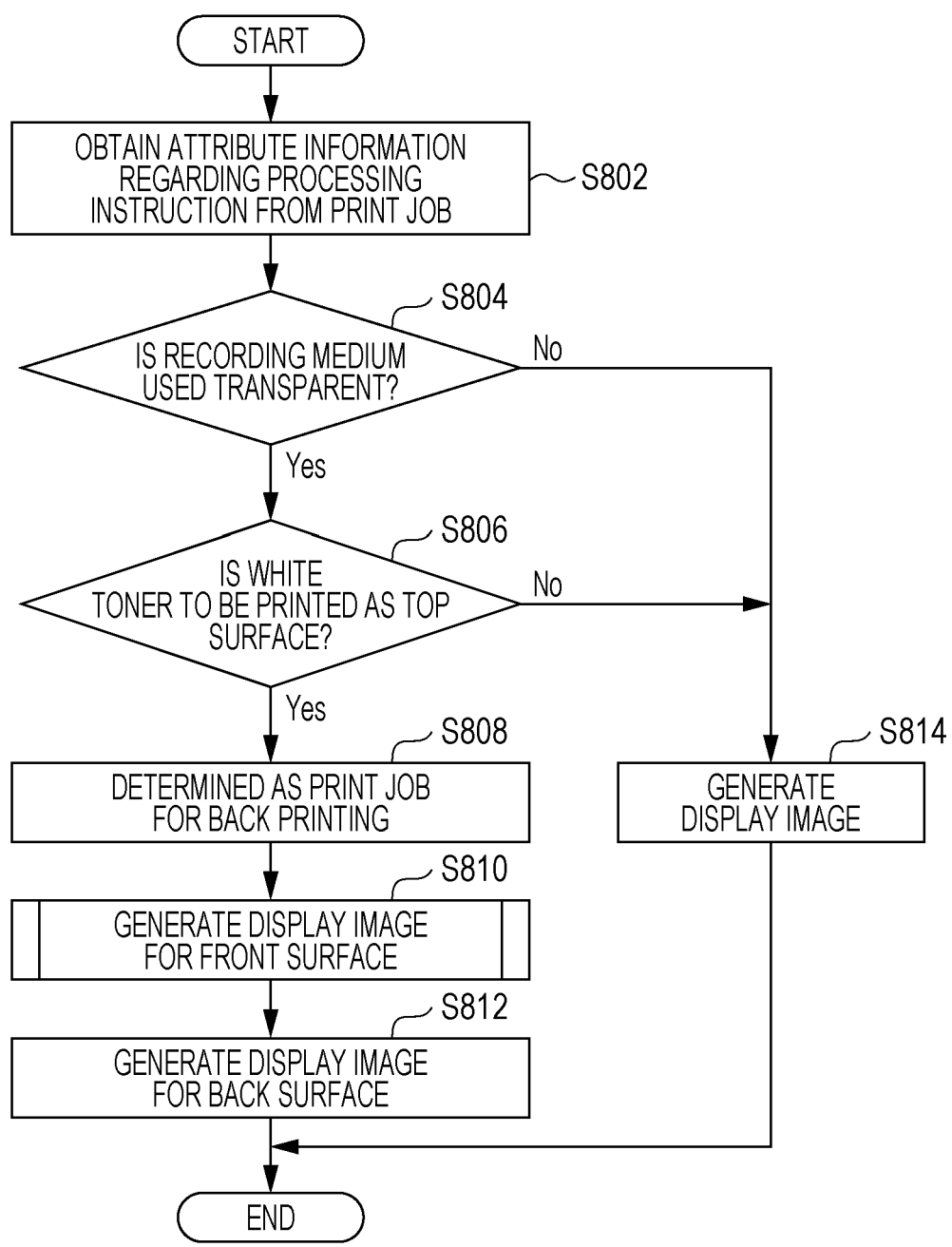
FIG. 8 is a flowchart illustrating an example of a process according to the exemplary embodiment.

FIG. 8 is a flowchart illustrating an example of a process according to the present exemplary embodiment (a process performed by the display image generation module 115).

In step S802, attribute information regarding a processing instruction is obtained from a print job. The attribute information to be obtained is, for example, the print job table 600.

In step S804, whether a recording medium to be used is transparent. If so, the process proceeds to step S806, and if not, the process proceeds to step S814.

In step S806, whether white toner is to be printed as a top surface is determined. If so (i.e., in the case of a back printing), the process proceeds to step S808, and if not, the process proceeds to step S814. The "top surface" refers to a surface formed by a color material printed lastly. In the example illustrated in FIG. 3, the top surface is formed by the white color material 350 and is a surface farthest from the recording medium 300.

In step S808, the print job is determined as one for back printing.

In step S810, a display image to be printed on a front surface is generated. Details of step S810 will be described later with reference to a flowchart of FIG. 9.

In step S812, a display image to be printed on a back surface is generated.

In step S814, a display image is generated. A conventional display image is generated. Alpha blending, for example, may be performed.

Figure 9:
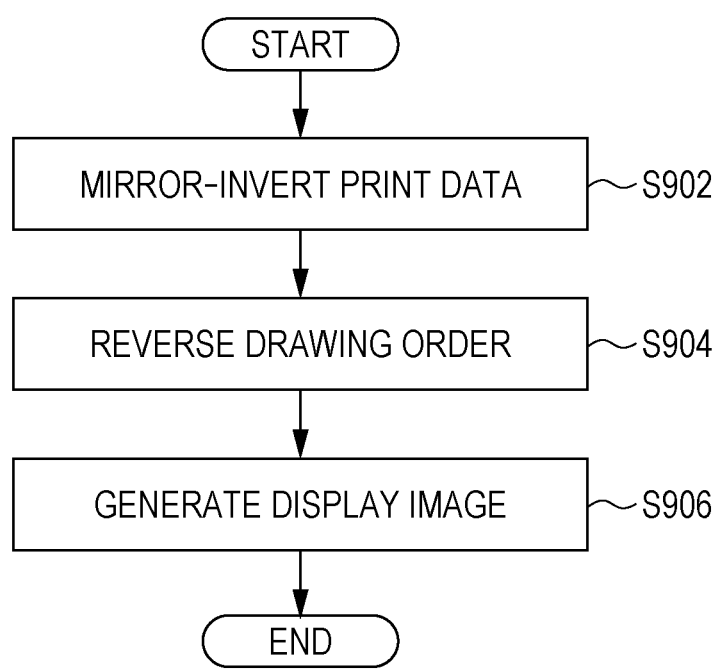
FIG. 9 is a flowchart illustrating an example of a process according to the exemplary embodiment.

FIG. 9 is a flowchart illustrating an example of a process according to the present exemplary embodiment (a process performed by the display image generation module 115).

In step S902, print data is mirror-inverted.

In step S904, drawing order is reversed.

In step S906, a display image is generated. Alpha blending, for example, may be performed.

Figure 10:
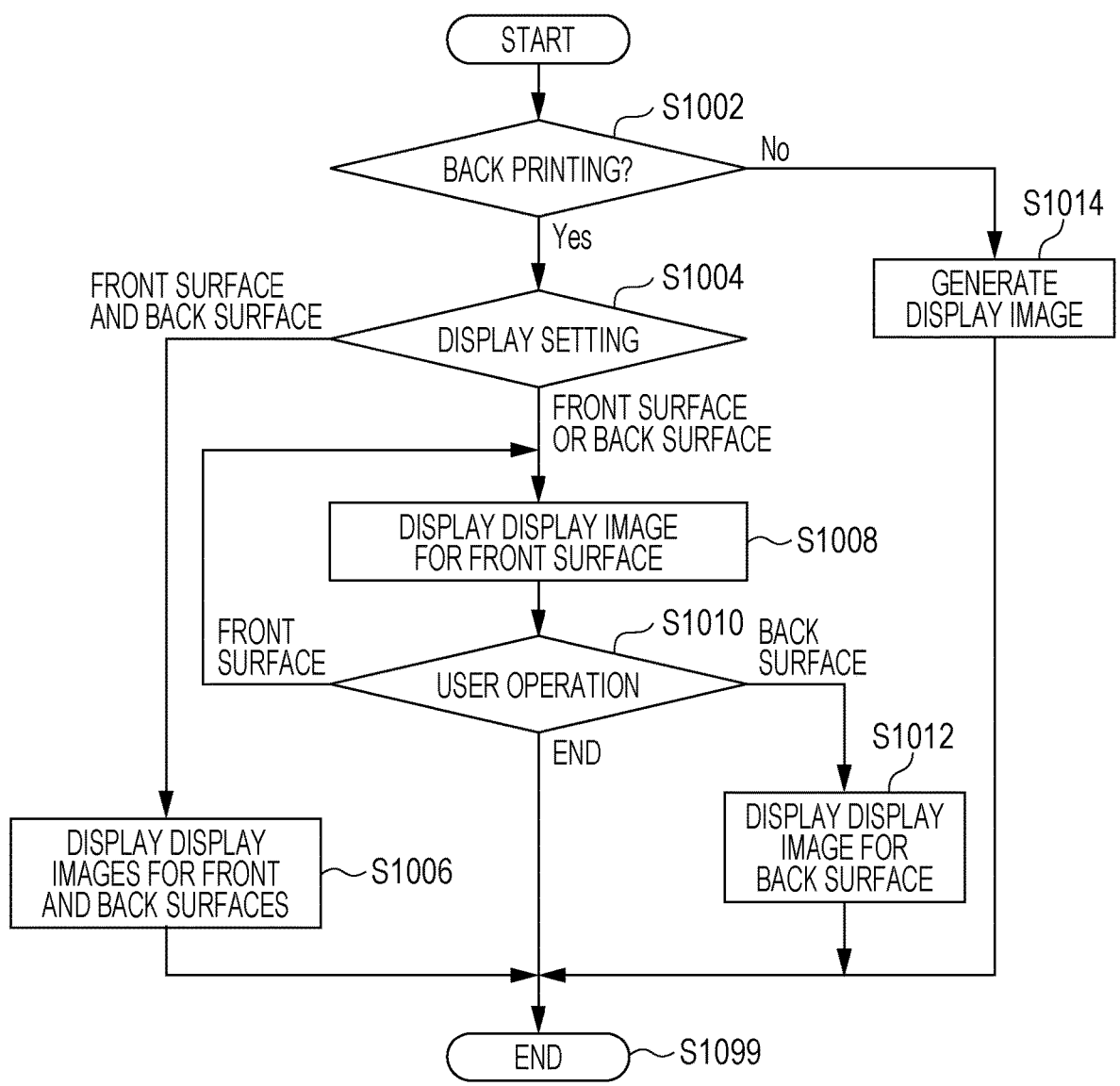
FIG. 10 is a flowchart illustrating an example of a process according to the exemplary embodiment.

FIG. 10 is a flowchart illustrating an example of a process according to the present exemplary embodiment (a process performed by the display module 125).

In step S1002, whether back printing is to be performed is determined. If so, the process proceeds to step S1004, and if not, the process proceeds to step S1014.

In step S1004, a display setting is identified. In the case of both a front surface and a back surface, the process proceeds to step S1006. In the case of either a front surface or a back surface, the process proceeds to step S1008.

In step S1006, display images for the front and back surfaces are displayed.

In step S1008, a display image to be printed on the front surface is displayed.

In step S1010, a user operation is identified. In the case of the front surface, the process returns to step S1008. In the case of the back surface, the process proceeds to step S1012. In the case of ending, the process ends (step S1099).

In step S1012, a display image to be printed on the back surface is displayed.

In step S1014, a display image is displayed.

Figure 11A:
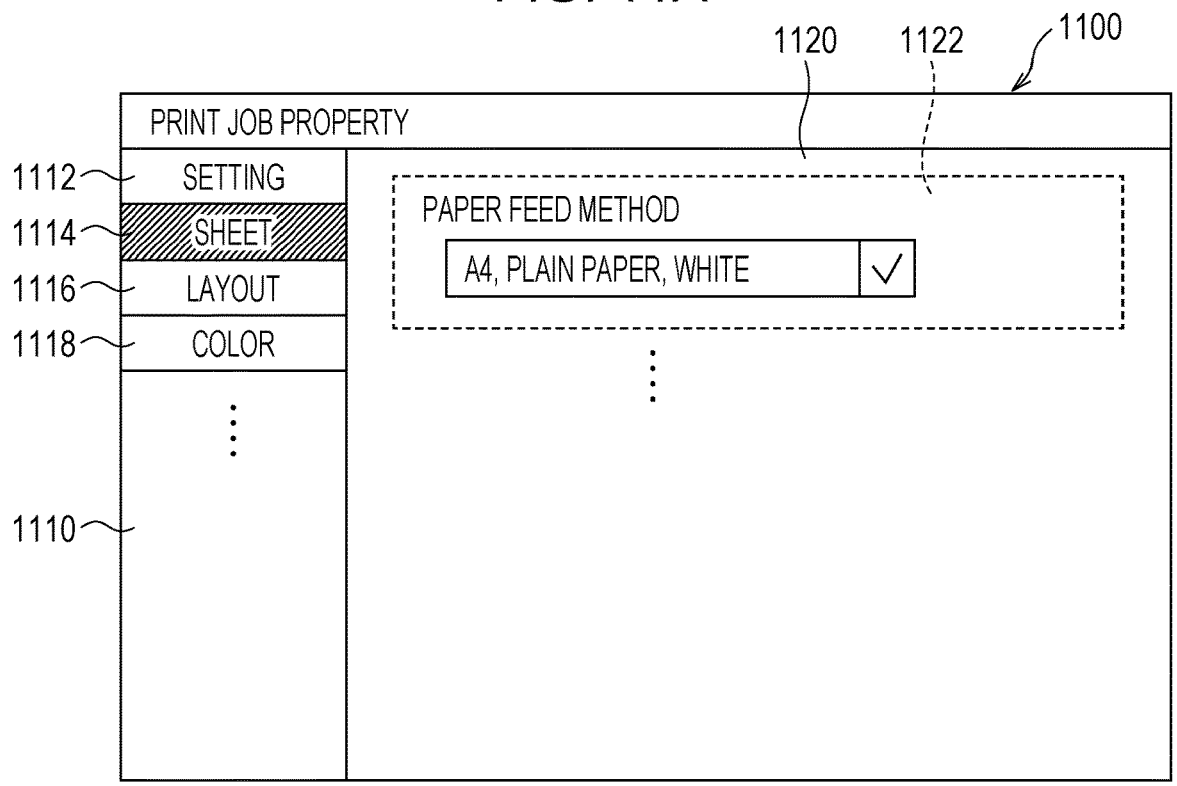
FIGS. 11A and 11B are diagrams illustrating an example of a print job property screen and a viewer screen, respectively.
Figure 11B:
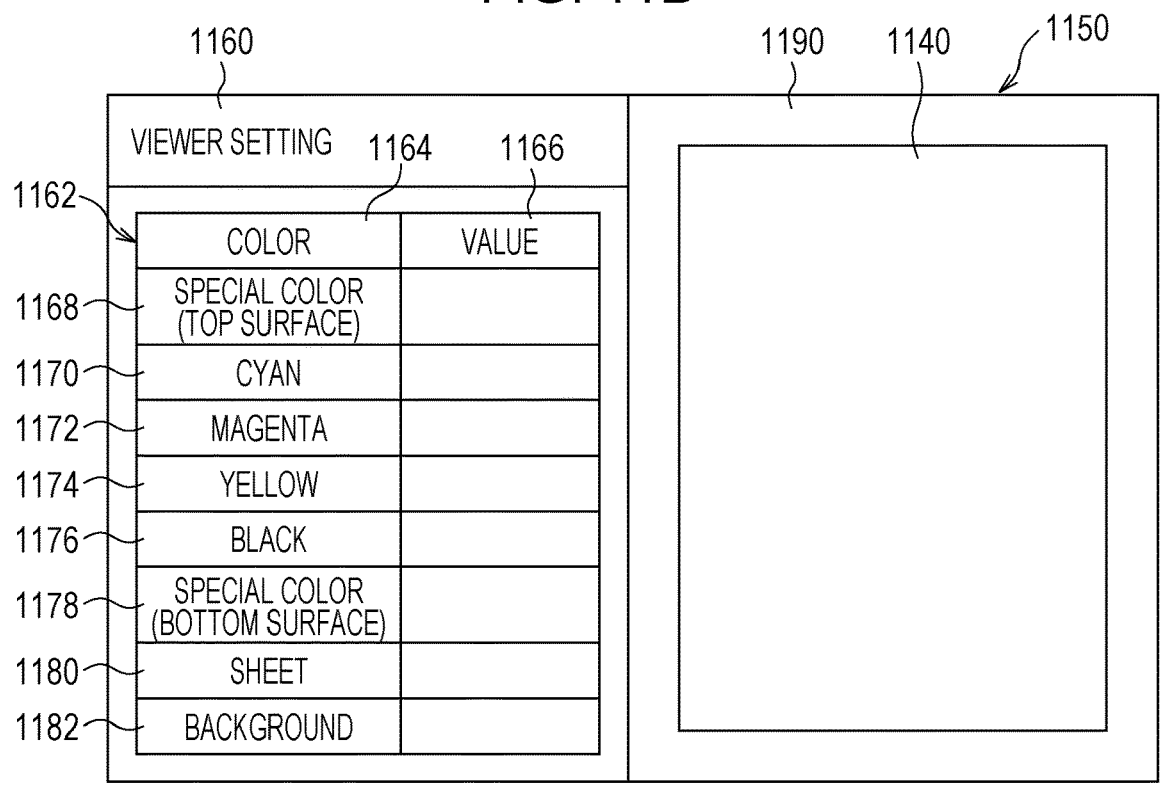

FIGS. 11A and 11B are diagrams illustrating an example of a print job property screen 1100 and a viewer screen 1150, respectively.

FIG. 11A illustrates an example of the print job property screen 1100. The print job property screen 1100 displays content of a print job and includes a print job property item selection area 1110 and a print job property content display area 1120.

The print job property item selection area 1110 includes setting 1112, sheet 1114, layout 1116, and color 1118. If the sheet 1114 is selected, the print job property content display area 1120 displays a paper feed method display and change area 1122 and the like. The paper feed method display and change area 1122 displays a recording medium specified in the print job. The recording medium may be changed in the paper feed method display and change area 1122 in accordance with a user operation. More specifically, the user operation reception module 120 may receive an operation for changing the recording medium (change to a film or the like) performed by the user.

FIG. 11B illustrates an example of the viewer screen 1150. The viewer screen 1150 displays a preview image and is used to adjust tones and the like. The viewer screen 1150 includes a viewer setting area 1160 and a viewer area 1190. The viewer setting area 1160 displays a color adjustment table 1162.

The color adjustment table 1162 includes a color field 1164 and a value field 1166 in a column direction and a special color (top surface) field 1168, a cyan field 1170, a magenta field 1172, a yellow field 1174, a black field 1176, a special color (bottom surface) field 1178, a sheet field 1180, and a background field 1182. Order of these fields may indicate how printing is performed. That is, the fields from the special color (top surface) field 1168 to the special color (bottom surface) field 1178 may indicate order of printing of colors employed by the image forming apparatus 190. When a front surface is displayed in back printing, the order may be reversed. The value field 1166 stores values (e.g., ratios at which color materials are used) for corresponding colors. The user can adjust tones by changing the values.

The viewer area 1190 includes a drawing area 1140. The drawing area 1140 displays a display image (for a back surface, a front surface, or both) generated by the display image generation module 115.

FIGS. 12A1 to 12B2 are diagrams illustrating examples of processes according to the present exemplary embodiment. FIGS. 12A1 and 12A2 illustrate an example of a process performed for the front view 360. FIGS. 12B1 and 12B2 illustrate an example of a process performed for the back view 370. FIGS. 12A1 and 12B1 illustrate examples of layer structures at a time when the display module 125 displays a display image. FIGS. 12A2 and 12B2 illustrate examples of corresponding display images.

FIG. 12A1 illustrates layers of an image preview area (background) 1210a, a white image 1250a, a CMYK image 1240a, and a medium color image 1220a from bottom to top. Since the CMYK image 1240a is a display image, the CMYK image 1240 is an RGB image.

FIG. 12B1 illustrates layers of an image preview area (background) 1210b, a medium color image 1220b, a CMYK image 1240b, and a white image 1250b from bottom to top. FIG. 12B1 illustrates a conventional preview, but the white image 1250b is a top surface. Since the CMYK image 1240b is a display image, the CMYK image 1240 is an RGB image.

The white image 1250b is mirror-inverted and moved from the top surface to a bottom surface (more accurately a bottom surface except for the image preview area (background) 1210b; the same holds in the following description) to obtain the white image 1250a.

The CMYK image 1240b is mirror-inverted to obtain the CMYK image 1240a.

The medium color image 1220b is moved from the bottom surface to the top surface to obtain the medium color image 1220a. Because the medium color images 1220a and 1220b are transparent, the medium color images 1220a and 1220b may be omitted.

In the CMYK image 1240b, a white area 1241b, a green area 1242b, a red area 1243b, a black area 1244b, and a text area 1245b are drawn.

In the CMYK image 1240a, a white area 1241a, a green area 1242a, a red area 1243a, a black area 1244a, and a text area 1245a are drawn.

In the white image 1250a, white areas 1251b, 1252b, 1253b, and 1254b and a text area (white) 1255b are drawn.

In the white image 1250a, white areas 1251a, 1252a, 1253a, and 1254a and a text area (white) 1255a are drawn.

Colors of pixels in image previews 1200a and 1200b illustrated in FIGS. 12A2 and 12B2, respectively, are generated by performing alpha blending based on colors of corresponding pixels in each layer.

An example of the hardware configuration of the image processing apparatus 100 according to the present exemplary embodiment will be described with reference to FIG. 13. The configuration illustrated in FIG. 13 is achieved, for example, by a personal computer (PC) or the like. FIG. 13 illustrates an example of the hardware configuration including a data reading unit 1317 such as a scanner and a data output unit 1318 such as a printer.

A CPU 1301 is a control unit that performs a process according to a computer program describing execution sequences of the various modules described in the above exemplary embodiment, such as the print job reception module 105, the preview image display module 110, the display image generation module 115, the user operation reception module 120, the display module 125, and the image forming apparatus communication module 130.

A read-only memory (ROM) 1302 stores programs, arithmetic parameters, and the like to be used by the CPU 1301. A RAM 1303 stores a program to be executed by the CPU 1301, parameters that change as the program is executed, and the like. These components are connected to one another by a host bus 1304 such as a CPU bus.

The host bus 1304 is connected to an external bus 1306 such a peripheral component interconnect/interface (PCI) bus through a bridge 1305.

A keyboard 1308 and a pointing device 1309 such as a mouse are devices operated by an operator. A display 1310 may be a liquid crystal display device, a cathode ray tube (CRT), or the like and displays various pieces of information as text and image information. Alternatively, a touch screen having functions of both the pointing device 1309 and the display 1310 may be used. In this case, functions of a keyboard may be achieved by drawing a keyboard (a so-called "software keyboard", "screen keyboard", etc.) on the screen (touch screen), instead of physically connecting the keyboard 1308.

A hard disk drive (HDD) 1311 includes a hard disk (or a flash memory, etc.) and drives the hard disk to record or execute a program or information to be executed by the CPU 1301. The hard disk stores the print job table 600, the image forming apparatus information table 700, print data, display images, and the like. The hard disk also stores various other pieces of data, various computer programs, and the like.

A drive 1312 reads data or a program recorded on a removable recording medium 1313 inserted thereinto, such as a magnetic disk, an optical disc, a magneto-optical (MO) disk, or a semiconductor memory and supplies the data or the program to the RAM 1303 connected through an interface 1307, the external bus 1306, the bridge 1305, and the host bus 1304. The removal recording medium 1313 may also be used as a data recording area.

A connection port 1314 is used to connect an external connection device 1315 and includes a connection unit such as universal serial bus (USB) port, an Institute of Electrical and Electronics Engineers (IEEE) 1394 port, or the like. The connection port 1314 is connected to the CPU 1301 and the like through the interface 1307, the external bus 1306, the bridge 1305, the host bus 1304, and the like. A communication unit 1316 is connected to a communication link and performs a process for communicating data with the outside. The data reading unit 1317 is a scanner, for example, and performs a process for reading a document. The data output unit 1318 is a printer, for example, and performs a process for outputting document data.

The hardware configuration of the printing process management apparatus illustrated in FIG. 13 is an example, and the present exemplary embodiment is not limited to the configuration illustrated in FIG. 13. Any configuration may be employed insofar as the modules described in the above-described exemplary embodiment can be achieved. For example, some modules may be achieved by dedicated hardware (e.g., an application-specific integrated circuit (ASIC), etc.). In addition, some modules may be provided in an external system and connected by a communication line. In addition, the system illustrated in FIG. 13 may be connected to other systems of the same type by a communication line and operate in combination with the other systems. In addition, the system may be incorporated into a mobile information communication device (a mobile phone, a smartphone, a mobile device, a wearable computer, etc.), an information home appliance, a robot, a copier, a fax machine, a scanner, a printer, a multifunction peripheral (an image processing apparatus having functions of two or more of a scanner, a printer, a copier, a fax machine, and the like), or the like, instead of a PC.

The program described above may be stored in a recording medium and provided or provided using communication means. In this case, for example, the program may be regarded as constituting a non-transitory computer readable medium storing a program.

A term "non-transitory computer readable medium storing a program" refers to a non-transitory computer readable medium storing a program used to install, execute, or distribute the program.

The non-transitory computer readable medium may be, for example, a digital versatile disc (DVD)-R, a DVD-RW, a DVD-RAM, or the like specified by a DVD forum, a DVD+R, a DVD+RW, or the like specified by DVD+RW, a compact disc read-only memory (CD-ROM), a CD-recordable (CD-R), a CD-rewritable (CD-RW), a Blu-ray Disc (BD; registered trademark), an MO disk, a flexible disk (FD), a magnetic tape, a hard disk, a ROM, an electrically erasable programmable read-only memory (EEPROM), a flash memory, a RAM, a secure digital (SD) memory card, or the like.

The entirety or a part of the program may be recorded in the non-transitory computer readable medium and preserved or distributed. The program may be transferred through a wired network or a wireless network used for a local area network (LAN), a metropolitan area network (MAN), a wide area network (WAN), the Internet, an intranet, an extranet, or the like or a transfer medium such as a combination of these networks. Alternatively, the program may be transmitted on carrier waves.

Furthermore, the program may be a part or the entirety of another program, or may be recorded in a recording medium along with another program. Alternatively, the program may be divided and recorded in a plurality of recording media. In addition, the program may be compressed, encrypted, or recorded in any other mode insofar as the program can be restored.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising a processor configured to:
   receive a print job which includes print data and which specifies back printing to be performed on a transparent recording medium;

generate a first preview image which indicates a first image, wherein the first image being an image of the print data to be printed on a back of the transparent recording medium and to be viewed from a front of the transparent recording medium;

generate a second preview image which indicate a second image, wherein the second image being an image of the print data to be printed on the back of the transparent recording medium and to be viewed from the back of the transparent recording medium; and display the first preview image in the front view and the second preview image in the back view, wherein the first preview image and the second preview image are alternately displayed on a screen by alternating the first preview image and the second preview image according to a time predetermined interval, wherein the processor configured not to display the second preview image while the first preview image is displayed, and not to display the first preview image while the second preview image is displayed.

2. The image processing apparatus according to claim 1, wherein the processor also receives a print job that specifies a front printing and in response to the print job received by the processor specifies the back printing, and displays the first preview image in the front view as an initial setting.

3. The image processing apparatus according to claim 2, wherein, in response to the print job received by the processor specifies the front printing, generates only a third preview image in a front view which is seen on a print surface of a recording medium, and displays only the third preview image in the front view.

4. The image processing apparatus according to claim 1, wherein the processor generates a display image at a time when a special color is printed lastly.

5. The image processing apparatus according to claim 4, wherein the processor generates the first preview image in the front view by mirror-inverting the print data and drawing the print data reversely from printing order of the print data.

6. A non-transitory computer readable medium storing a program causing a computer to execute a process for processing an image, the process comprising:

receiving a print job that includes print data and that specifies back printing to be performed on a transparent recording medium;

generating a first preview image which indicates a first image, wherein the first image being an image of the print data to be printed on a back of the transparent recording medium and to be viewed from a front of the transparent recording medium;

generating a second preview image which indicate a second image, wherein the second image being an image of the print data to be printed on the back of the transparent recording medium and to be viewed from the back of the transparent recording medium; and displaying the first preview image in the front view and the second preview image in the back view, wherein the first preview image and the second preview image are alternately displayed on a screen by alternating the first preview image and the second preview image according to a time predetermined interval, wherein the processor configured not to display the second preview image while the first preview image is displayed, and not to display the first preview image while the second preview image is displayed.

7. A method for processing an image, the method comprising:

receiving a print job that includes print data and that specifies back printing to be performed on a transparent recording medium;

generating a first preview image which indicates a first image, wherein the first image being an image of the print data to be printed on a back of the transparent recording medium and to be viewed from a front of the transparent recording medium;

generating a second preview image which indicate a second image, wherein the second image being an image of the print data to be printed on the back of the transparent recording medium and to be viewed from the back of the transparent recording medium; and displaying the first preview image in the front view and the second preview image in the back view, wherein the first preview image and the second preview image are alternately displayed on a screen by alternating the first preview image and the second preview image according to a predetermined time interval, wherein the processor configured not to display the second preview image while the first preview image is displayed, and not to display the first preview image while the second preview image is displayed.

8. The image processing apparatus of claim 1, wherein the second image comprises silhouettes of objects which are in a same predetermined color.

* * * * *